United States Patent
Perry et al.

(10) Patent No.: US 9,083,019 B2
(45) Date of Patent: Jul. 14, 2015

(54) SYSTEM AND METHOD FOR OPERATING A FLOW BATTERY SYSTEM AT AN ELEVATED TEMPERATURE

(75) Inventors: Michael L. Perry, Glastonbury, CT (US); Rachid Zaffou, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/160,193

(22) Filed: Jun. 14, 2011

(65) Prior Publication Data

US 2012/0321920 A1   Dec. 20, 2012

(51) Int. Cl.
| | |
|---|---|
| H01M 8/04 | (2006.01) |
| H01M 8/18 | (2006.01) |
| H01M 8/20 | (2006.01) |
| H01M 2/40 | (2006.01) |
| H01M 10/60 | (2014.01) |

(52) U.S. Cl.
CPC ...... *H01M 8/04276* (2013.01); *H01M 8/04029* (2013.01); *H01M 8/188* (2013.01); *H01M 2/40* (2013.01); *H01M 8/20* (2013.01); *H01M 10/50* (2013.01); *Y02E 60/528* (2013.01)

(58) Field of Classification Search
None
See application file for complete search history.

(56) References Cited

U.S. PATENT DOCUMENTS

| | | | |
|---|---|---|---|
| 4,786,567 A * | 11/1988 | Skyllas-Kazacos et al. | .... 429/51 |
| 5,318,865 A * | 6/1994 | Kaneko et al. | ........... 429/345 |
| 6,562,514 B1 * | 5/2003 | Kazacos et al. | .......... 429/204 |
| 7,045,236 B1 * | 5/2006 | Andrew et al. | ............ 429/83 |
| 7,078,118 B2 | 7/2006 | Schrooten et al. | |
| 7,265,456 B2 | 9/2007 | Hennessy | |
| 7,438,986 B2 | 10/2008 | Shimotori et al. | |
| 7,473,485 B2 | 1/2009 | Burlatsky et al. | |
| 2004/0121204 A1 * | 6/2004 | Adelman et al. | ............. 429/22 |
| 2005/0074665 A1 * | 4/2005 | Spaziante et al. | ........... 429/50 |
| 2005/0158614 A1 * | 7/2005 | Hennessy | .................. 429/61 |
| 2007/0157922 A1 | 7/2007 | Radhakrishnan et al. | |
| 2008/0090129 A1 | 4/2008 | Kunz et al. | |
| 2009/0014059 A1 | 1/2009 | Radhakrishnan et al. | |
| 2010/0003545 A1 | 1/2010 | Horne | |
| 2010/0143809 A1 | 6/2010 | Perry et al. | |
| 2010/0216038 A1 | 8/2010 | Cardenas-Valencia et al. | |

OTHER PUBLICATIONS

Dabrowski et al., Selective removal of the heavy metal ions from waters and industrial wastewaters by ion-exchange method, Elsevier, Chemosphere 56 (2004) 91-106.*
Ponce de Leon et al. "Redox Flow Cells for Energy Conversion", Journal of Power Sources 160, May 26, 2006, pp. 716-732.

* cited by examiner

*Primary Examiner* — Miriam Stagg
*Assistant Examiner* — Carmen Lyles-Irving
(74) *Attorney, Agent, or Firm* — O'Shea Getz P.C.

(57) ABSTRACT

A flow battery system includes a flow battery stack, a sensor and a coolant loop. The flow battery stack has an electrolyte solution flowing therethrough, and the sensor is in communication with the electrolyte solution. The coolant loop is in heat exchange communication with the electrolyte solution, wherein the heat exchange communication is selective based on an output from the sensor.

8 Claims, 4 Drawing Sheets

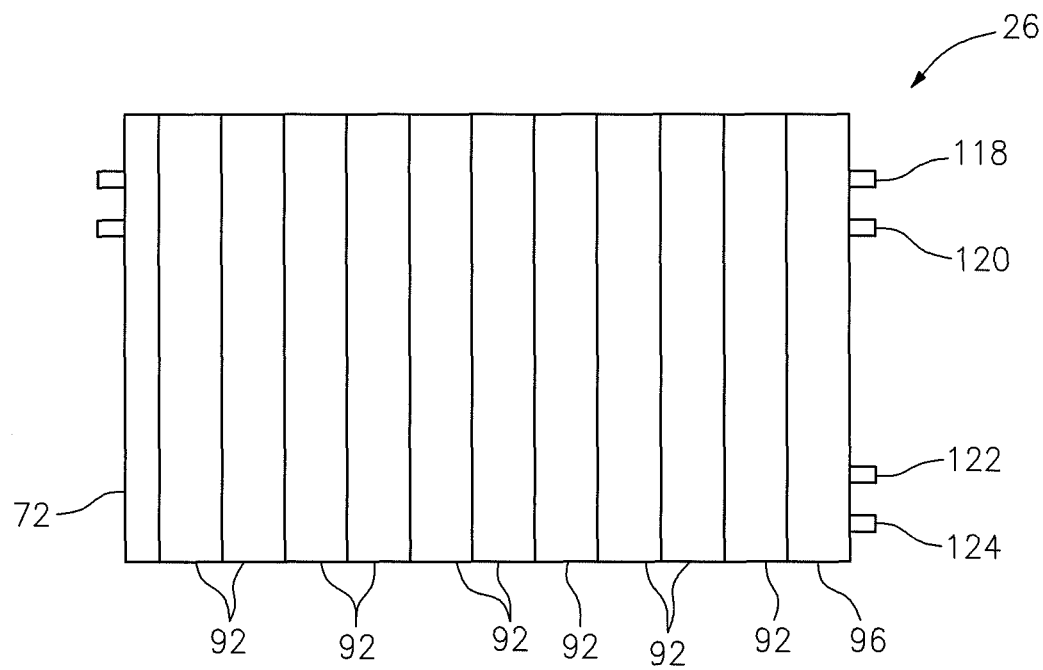
FIG. 2
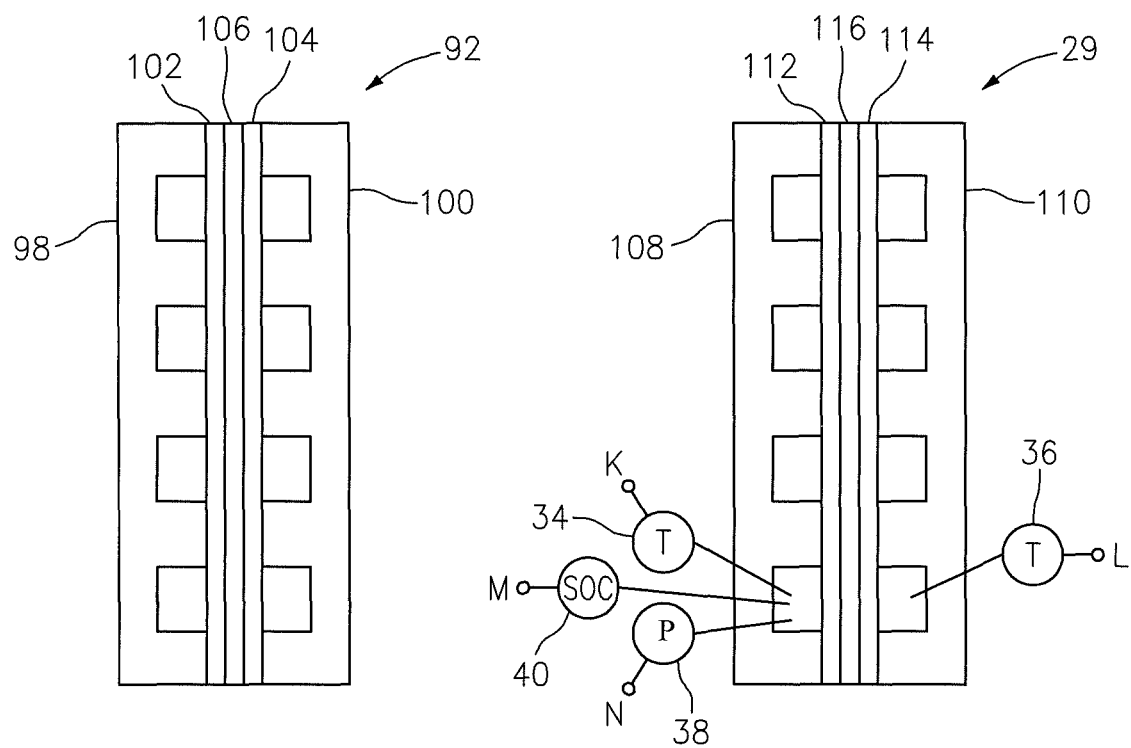
FIG. 3
FIG. 4

SYSTEM AND METHOD FOR OPERATING A FLOW BATTERY SYSTEM AT AN ELEVATED TEMPERATURE

CROSS-REFERENCE TO RELATED APPLICATIONS

This application is related to PCT/US09/68681, U.S. patent application Ser. No. 13/084,156, U.S. patent application Ser. No. 13/023,101, and U.S. patent application Ser. No. 13/022,285, each of which is incorporated by reference in its entirety.

BACKGROUND

1. Technical Field

This disclosure relates generally to a flow battery system and, more particularly, to a system and method for operating a flow battery system at an elevated temperature.

2. Background Information

A typical flow battery system includes a stack of flow battery cells, each cell having an ion-exchange membrane disposed between negative and positive electrodes. During operation, a catholyte solution flows through the positive electrode, and an anolyte solution flows through the negative electrode. The catholyte and anolyte solutions each electrochemically react in a reversible reduction-oxidation ("redox") reaction. Ionic species are transported across the ion-exchange membrane during the reactions, and electrons are transported through an external circuit such as a power converter to complete the electrochemical reactions.

An example of a pair of catholyte and anolyte solutions is a pair of vanadium/vanadium solutions. The vanadium catholyte solution typically includes a plurality of $V^{4+}$ and/or $V^{5+}$ ions. The vanadium anolyte solution typically includes a plurality of $V^{2+}$ and/or $V^{3+}$ ions. Ideally, the concentrations of these vanadium ion species should be as high as possible in order to minimize the size of the tank required for a given amount of energy storage; i.e., higher concentrations enable a flow battery system with a higher energy density. However, the concentrations are limited by the solubility of the vanadium salts in the solvent electrolyte, which is typically an aqueous acid such as sulfuric acid. Additionally, the solubility of these different vanadium salts (e.g., vanadium sulfates) vary with the temperature of the solution. The $V^{2+}$, $V^{3+}$ and $V^{4+}$ salts are generally less acid soluble at lower temperatures. The $V^{5+}$ ions, on the other hand, are generally less acid soluble at higher temperatures. An additional complication is that the concentrations of the different oxidation states may vary with the state-of-charge (SOC) of the battery and, ideally, one would like the salts to remain in solution over a wide range of SOC (e.g., from 0 to 100% SOC, such that salt solubility does not limit the minimum or maximum SOC). For example, a typical electrolyte composition used in a vanadium redox battery system is an aqueous solution of approximately 1.5 to 2.0 molar (M) vanadium sulfate and 1.5 to 2.0 M sulfuric acid for both the anolyte and the catholyte. The anolyte and catholyte composition enables an operating range of approximately zero to forty degrees Celsius, with the lower temperature limit determined by the solubility of the $V^{2+}$, $V^{3+}$ and $V^{4+}$ salts and the upper temperature limit determined by the solubility of the $V^{5+}$ salt. Vanadium flow battery systems, therefore, are typically operated within a relatively narrow temperature range (e.g., approximately zero and forty degrees Celsius) to prevent formation of metal salt precipitates. A wider temperature window would be beneficial since a lower minimum temperature would eliminate the need for "freeze" prevention measures and a higher maximum temperature can enable improved cell performance, as well as improved heat rejection to the environment (especially on hot days where ambient temperatures are close to, or may even exceed, forty degrees Celsius).

BRIEF DESCRIPTION OF THE DRAWINGS

FIG. 2 illustrates a flow battery stack included in the flow battery system illustrated in FIG. 1;

FIG. 3 illustrates a cross-section of a flow battery cell included in the flow battery system illustrated in FIG. 1;

FIG. 4 illustrates a cross-section of a reference cell included in the flow battery system illustrated in FIG. 1;

DETAILED DESCRIPTION

Figure 1:
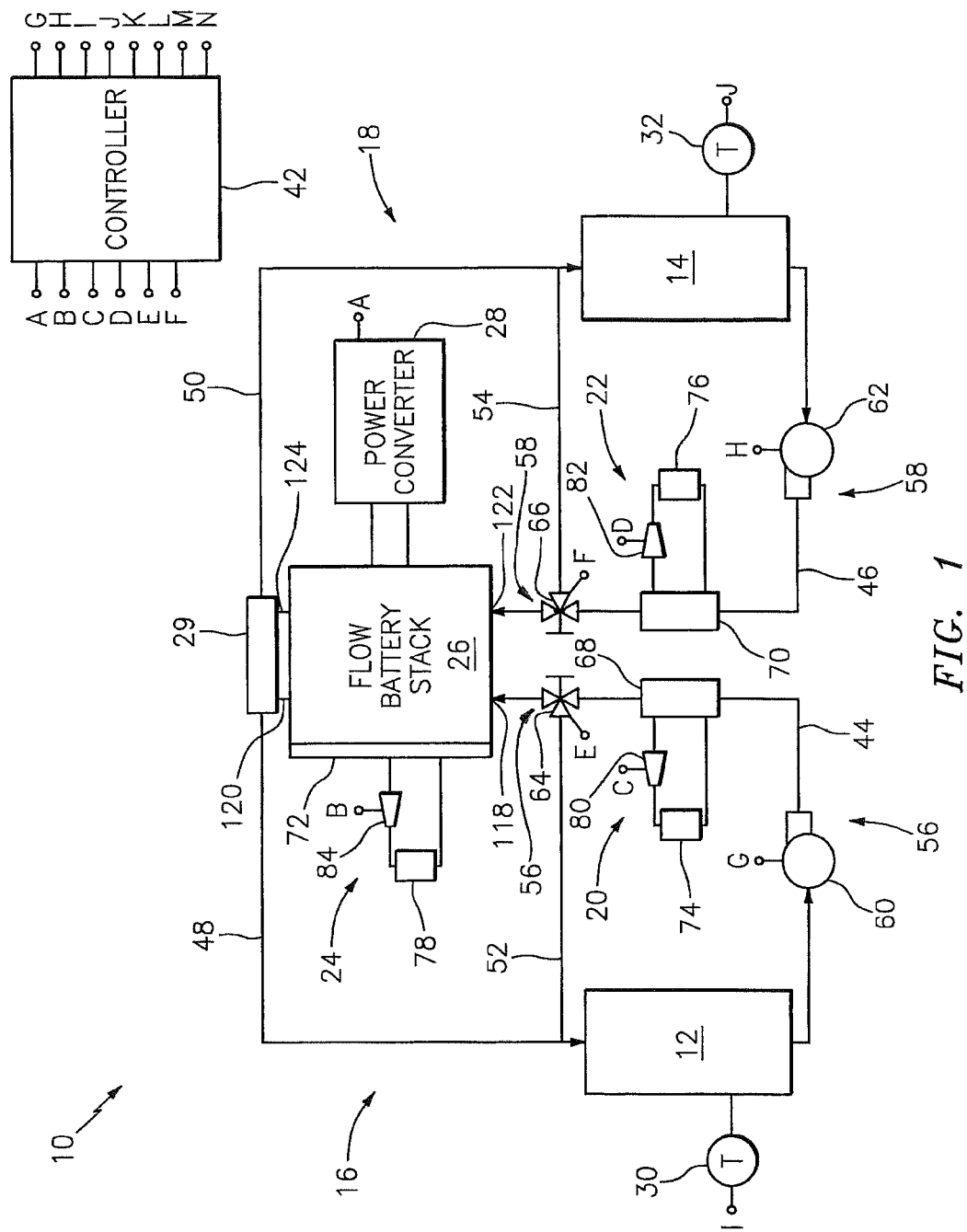
FIG. 1 is a schematic illustration of a flow battery system.

FIG. 1 illustrates a flow battery system 10. The flow battery system 10 includes a first reservoir 12, a second reservoir 14, a first solution flow circuit 16, a second solution flow circuit 18, a plurality of coolant loops 20, 22 and 24, a flow battery stack 26, a power converter 28, a reference cell 29, a plurality of sensors 30-40 (see FIGS. 1 and 4), and a controller 42.

The first reservoir 12 contains a first electrolyte solution (e.g., a vanadium catholyte). The second reservoir 14 contains a second electrolyte solution (e.g., a vanadium anolyte).

The first and second solution flow circuits 16 and 18 may each include a source conduit 44, 46, a return conduit 48, 50, a bypass conduit 52, 54 and a flow regulator 56, 58, respectively. The flow regulator 56, 58 may include a variable speed pump 60, 62, and an electronically actuated three-way valve 64, 66, respectively. The pump 60, 62 and the valve 64, 66 are fluidly connected inline within the source conduit 44, 46, respectively. The bypass conduit 52, 54 fluidly connects the valve 64, 66 to the return conduit 48, 50, respectively.

The coolant loops may include a first flow circuit coolant loop 20, a second flow circuit coolant loop 22 and a stack coolant loop 24. Each coolant loop 20, 22, 24 may include a first heat exchanger 68, 70, 72, a second heat exchanger 74, 76, 78, and a circulation pump 80, 82, 84, respectively. The first and second heat exchangers and the circulation pump are fluidly connected in a closed loop. Each circulation pump circulates heat exchange fluid through its associated first and second heat exchangers in response to a respective circulation pump control signal. The heat exchange fluid can be water or an anti-freeze solution (e.g., ethylene glycol) or any other fluid with desirable properties (e.g., high heat capacity, low viscosity, etc.). One or more of the second heat exchangers 74, 76, 78 can be, for example, simple air-cooled radiators. Alternatively, no second heat exchange device is required if the first heat exchanger is cooled directly with air (e.g., a fan is used as the "circulation pump" and air is the heat exchange fluid).

FIG. 2 illustrates the flow battery stack 26, which includes one or more flow battery cells 92 and a stack manifold 96.

FIG. 3 illustrates a cross-section of one of the flow battery cells 92. Each flow battery cell 92 includes a first current collector 98, a second current collector 100, a liquid-porous first electrode layer 102, a liquid-porous second electrode layer 104, and a separator 106. The first electrode layer 102 may be a cathode, and the second electrode layer 104 may be an anode. The first electrode layer 102 may be coated with an acidic material (e.g., Nafion® polymer manufactured by DuPont of Wilmington, Del., United States) that at least partially impedes formation of precipitate within the first electrolyte solution. The separator 106 may be an ion-exchange membrane (e.g., Nafion® polymer membrane manufactured by DuPont of Wilmington, Del., United States), and is positioned between the electrode layers 102 and 104. The electrode layers 102 and 104 are positioned between the current collectors 98 and 100.

Referring to FIGS. 2 and 3, the stack manifold 96 includes a first inlet 118, first outlet 120, a second inlet 122, and a second outlet 124. The first inlet 118 is fluidly connected to the first outlet 120 through the first current collector 98 and/or the first electrode layer 102 in each of the flow battery cells 92. Similarly, the second inlet 122 is fluidly connected to the second outlet 124 through the second current collector 100 and/or the second electrode layer 104 in each of the flow battery cells 92.

FIG. 4 illustrates a cross-section of the reference cell 29. The reference cell 29 is a flow battery cell that includes a plurality of sensors 34-40. The reference cell 29 includes a first current collector 108, a second current collector 110, a liquid-porous first electrode layer 112, a liquid-porous second electrode layer 114, and a separator 116. The first electrode layer 112 may be a cathode, and the second electrode layer 114 may be an anode. The first electrode layer 112 may be coated with an acidic material (e.g., Nafion® polymer manufactured by DuPont of Wilmington, Del., United States) that at least partially impedes formation of precipitate within the first electrolyte solution. The separator 116 may be an ion-exchange membrane (e.g., a Nafion® polymer membrane manufactured by DuPont of Wilmington, Del., United States), and is positioned between the electrode layers 112 and 114. The electrode layers 112 and 114 are positioned between the current collectors 108 and 110.

Referring to FIGS. 1 and 4, the sensors 30-40 may include a first reservoir temperature sensor 30, a second reservoir temperature sensor 32, a first cell temperature sensor 34, a second cell temperature sensor 36, a precipitate sensor 38 and a state-of-charge sensor 40. The first reservoir temperature sensor 30 senses the fluid temperature within the first reservoir 12, and the second reservoir temperature sensor 32 senses the fluid temperature within the second reservoir 14. The precipitate sensor 38 may include an optical detector that detects precipitate within an electrolyte solution based on, for example, the color of a dye mixed within the solution or the color of the precipitate that is likely to form (e.g., $V^{5+}$ can react with water to form vanadium pentoxide, $V_2O_5$, which is orange, whereas $V^{5+}$ sulfate is yellow). The state-of-charge sensor 40 may include a voltmeter that determines a state-of-charge of ions within an electrolyte solution based on open cell voltage (OCV). The term "state-of-charge" is used herein to describe a ratio of (i) a quantity of ions within a volume of a solution having a relatively high charge (e.g., $V^{5+}$ and/or $V^{2+}$) to (ii) a quantity of ions within the volume of the solution having a relatively low charge (e.g., $V^{4+}$ and/or $V^{3+}$).

Referring to FIG. 4, the first cell temperature sensor 34, the precipitate sensor 38, and the state-of-charge sensor 40 are disposed with the first current collector 108. The second cell temperature sensor 36 is disposed with the second current collector 110.

Referring again to FIG. 1, the source conduit 44 fluidly connects the first reservoir 12 to the flow battery stack 26, via the first stack manifold inlet 118. The return conduit 48 fluidly connects the flow battery stack 26, via the first stack manifold outlet 120, to the first reservoir 12. The source conduit 46 fluidly connects the second reservoir 14 to the flow battery stack 26, via the second stack manifold inlet 122. The return conduit 50 fluidly connects the flow battery stack 26, via the second stack manifold outlet 124, to the second reservoir 14. The reference cell 29 is connected in line with the return conduit 48, via the first current collector 108 and/or the first electrode layer 112 (see FIG. 4). The reference cell 29 is connected in line with the return conduit 50, via the second current collector 110 and/or the second electrode layer 114 (see FIG. 4).

The first heat exchanger 68 is fluidly connected inline within the source conduit 44 between the pump 60 and the valve 64, which thereby places the coolant loop 20 in heat exchange communication with the first electrolyte solution. The first heat exchanger 70 is fluidly connected inline within the source conduit 46 of the second solution flow circuit 18 between the pump 62 and valve 66, which thereby places the coolant loop 22 in heat exchange communication with the second electrolyte solution. The first heat exchanger 72 is thermally connected to the flow battery stack 26 and, thus, to each of the flow battery and reference cells 92 and 94 (see FIG. 2). The first heat exchanger 72 therefore places the coolant loop 24 in heat exchange communication with both the first and second electrolyte solutions.

The power converter 28 may be a two-way power inverter or a two-way DC/DC converter connected to a DC bus (not shown). The power converter 28 is electrically connected to the flow battery stack 26, and in particular, to the first and second current collectors 98 and 100, in each of the flow battery cells 92. Alternatively, the power converter 28 may be electrically connected to the current collectors on the opposite ends of the stack 26.

The controller 42 can be implemented using hardware, software, or a combination thereof. The hardware can include, for example, one or more processors, analog and/or digital circuitry, etc. The controller 42 is in signal communication (e.g., hardwired or wirelessly connected) with each of the sensors 30-40 (see FIGS. 1 and 2), each flow regulator 56, 58 via its associated pump 60, 62 and valve 64, 66, each coolant loop 20, 22, 24 via its associated circulation pump 80, 82, 84, and the power converter 28.

Figure 5:
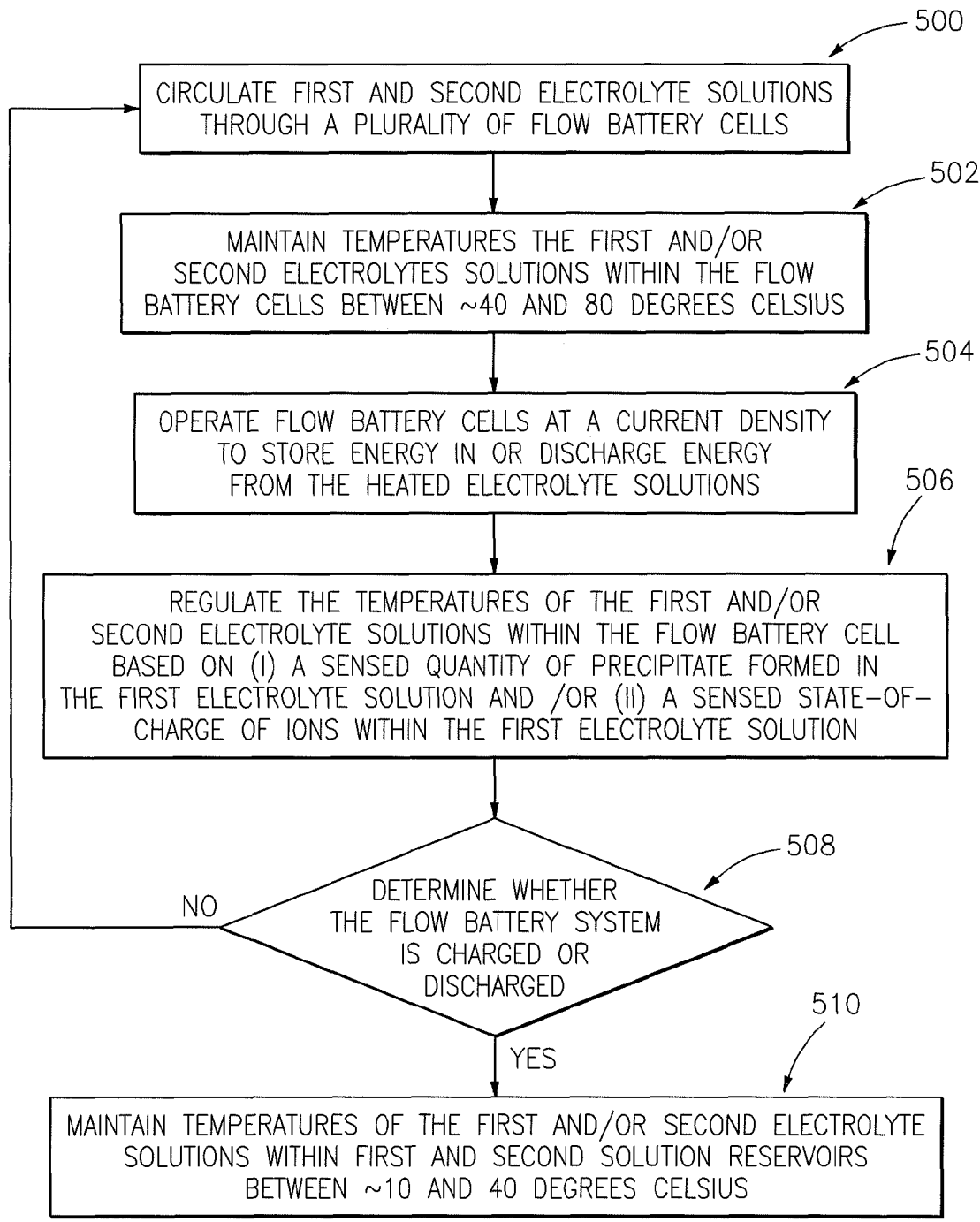
FIG. 5 is a flow diagram of a method for operating the flow battery system illustrated in FIG. 1.

FIG. 5 illustrates a method for operating the flow battery system 10 over a wide range of temperatures (e.g., between ~10° C. to ~80° C.). Referring to FIGS. 1-5, in step 500, the controller 42 signals the pump 60 and valve 64 in the first flow regulator 56 to circulate the first electrolyte solution between the first reservoir 12 and the flow battery stack 26. The controller 42 also signals the pump 62 and valve 66 in the second flow regulator 58 to circulate the second electrolyte solution between the second reservoir 14 and the flow battery stack 26. As the electrolyte solutions are circulated through the flow battery system 10, they are typically heated, for example, by heat generated as a byproduct of (i) inefficiencies in the flow battery cells 92 (e.g., ohmic losses) and/or (ii) operating the pumps 60 and 62 and/or other components of the flow battery system 10.

In step 502, the controller 42 selectively controls the heat exchange communication and, thus, a rate of heat exchange between one or more of the coolant loops 20, 22 and 24 and the first and/or second electrolyte solutions based on cell temperature signals respectively provided by the first and/or second cell temperature sensors 34 and 36. In particular, the controller 42 controls one or more of the coolant loops 20, 22 and 24 to maintain temperatures of the first and/or second electrolyte solutions within the flow battery and reference cells 92 and 29 in a desired operating range (e.g. between approximately 40° and 80° C.). The controller 42, for example, may allow the electrolyte solutions to be heated, by the heat generated from inefficiencies in the flow battery cells 92 and/or operation the components of the flow battery system 10, when the cell temperature signals indicate that the electrolyte solution temperatures within the cells 92 and/or 29 are approaching or are at a lower threshold (e.g., ≤40° C.). If necessary, waste heat from other sources such as the power converter 28, or even devices outside of the flow battery system 10 (e.g., local power generation devices) may be used to heat the electrolyte solutions, either directly or indirectly (e.g., by heating one of the second heat exchange devices). In contrast, the controller 42 may signal one or more of the circulation pumps to operate its respective coolant loop to cool the electrolyte solutions when the cell temperature signals indicate that the electrolyte solution temperatures within the cells 92 and/or 29 are approaching or are at an upper threshold (e.g., ≥80° C.).

Maintaining the temperatures of the electrolyte solutions between approximately 40° and 80° C. may enable the flow battery system 10 to charge and/or discharge at relatively high current densities (e.g., >100-200 mA/cm²). Operating at such high current densities may enable the flow battery system 10 to store or deliver higher power than operating the system 10 at low current densities, which may be desirable during some periods of the day or year. Operating at such high current densities may also decrease system runtime, and thereby enable the flow battery system to quickly meet fluctuating energy demands. The decreased runtime may also enable the flow battery to complete its charging or discharging before precipitation occurs. In addition, maintaining the temperatures above ~40° C. decreases the performance requirement of the coolant loop, relative to a coolant loop maintaining an electrolyte solution temperature below 40° C., which has less of a temperature difference relative to ambient temperature. Maintaining the temperatures above ~40° C. may also improve the performance of the cells, which may thereby increase flow battery system efficiency.

Each of the flow battery cells 92 are operated at a certain current density to store energy or discharge energy from the first and second electrolyte solutions, which are maintained at the desired temperature. In step 504, the controller 42 selects the current density at which the cells 92 are operated by signaling the power converter 28 to exchange (i.e., provide or receive) electrical current with the each of the flow battery cells 92 at a rate that corresponds to the desired current density. Alternatively, instead of controlling the rate of charge or discharge at a constant current, the rate may be controlled by controlling the power delivered to or released by the cells 92, by controlling the stack voltage, or by some combination thereof.

In step 506, the controller 42 selectively controls the heat exchange communication between the coolant loops 20, 22, 24 and the electrolyte solutions to regulate the temperatures of the electrolyte solutions, within the flow battery cells, based on (i) the sensed amount of precipitate formed in the first and/or second electrolyte solutions, and/or (ii) the sensed state-of-charge of ions within the first and/or second electrolyte solutions.

Figure 6:
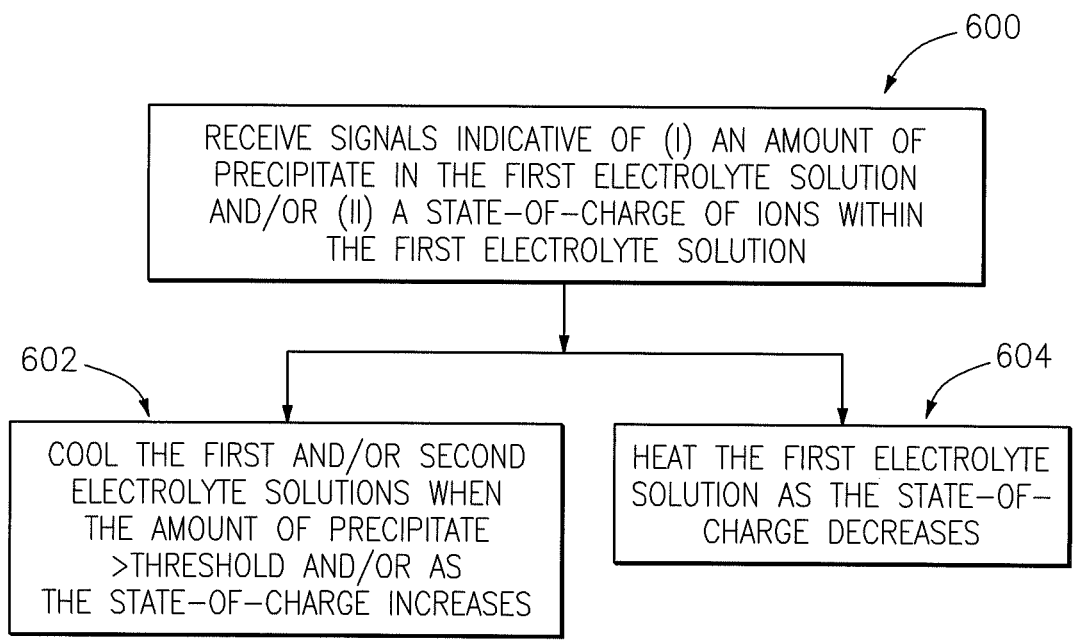
FIG. 6 is a flow diagram of a method for regulating temperatures of electrolyte solutions flowing through the flow battery system illustrated in FIG. 1.

FIG. 6 illustrates a method for regulating the temperature of the electrolyte solutions. Referring to FIGS. 1-4 and 6, in step 600, the controller 42 receives signals from the precipitate sensor 38 and/or state-of-charge sensor 40 indicative of a quantity of precipitate and a state-of-charge of ions in the first and/or second electrolyte solutions. The term "state-of-charge" is used herein, as indicated above, to describe a ratio of (i) a quantity of ions within a volume of a solution having a relatively high charge (e.g., $V^{5+}$) to (ii) a quantity of ions within the volume of the solution having a relatively low charge (e.g., $V^{4+}$).

In step 602, the controller 42 controls the stack coolant loop 24 and/or the flow circuit coolant loops 20 and 22 to cool the first and/or second electrolyte solutions when the quantity of precipitate and/or state-of-charge in the first and/or second electrolyte solution is greater than certain threshold values. The controller 42, for example, may control the first flow circuit coolant loop 20 to cool the first electrolyte solution, independent of the second electrolyte solution, when the quantity of precipitate in the first electrolyte solution is greater than the threshold value. The controller 42 may also control the first flow circuit coolant loop 20 to cool the first electrolyte solution to a relatively low temperature (e.g., ~40° C.) as the state-of-charge of the ions in the first electrolyte solution increases to a relatively high state-of-charge (e.g., where the majority of the ions are $V^{5+}$). The controller 42 therefore controls the first flow circuit coolant loop 20 to cool the first electrolyte solution as the flow battery system 10 is being charged. In step 604, on the other hand, the controller 42 may allow the first electrolyte solution to be heated, by heat generated from inefficiencies in the flow battery cells 92 and/or operation the components of the flow battery system 10, to a relatively high temperature (e.g., ~65°-80° C.) as the state-of-charge of the ions in the first electrolyte solution decreases to a relatively low state-of-charge (e.g., where the majority of the ions are $V^{4+}$). The first electrolyte solution therefore is heated as the flow battery system 10 is being discharged. Alternatively, the controller 42 may control one or more of the coolant loops 20, 22 and 24 to cool both electrolyte solutions as the state-of-charge of the ions in the first electrolyte solution increase, or allow both electrolyte solutions to be heated as the state-of-charge of the ions in the first electrolyte solution decreases.

Referring again to FIGS. 1-5, in step 508, the controller 42 determines whether the flow battery system 10 is charged or discharged based on the sensed state-of-charge of ions within the first electrolyte solution. The controller 42 may determine that the flow battery system 10 is discharged, for example, when the sensed state-of-charge is below a lower threshold (e.g., approximately five to ten percent of the ions in a vanadium catholyte are $V^{5+}$ ions). The controller 42 may determine that the flow battery system 10 is charged, on the other hand, when the sensed state-of-charge is above an upper threshold (e.g., approximately ninety to ninety-five percent of the ions in a vanadium catholyte are $V^{5+}$ ions). If the controller 42 determines that the flow battery system is not yet charged or discharged, method steps 500-508 are repeated. If the controller 42 determines that the flow battery system is charged or discharged, however, the method moves to step 510.

In step 510, the controller 42 selectively controls the heat exchange communication between one or more of the coolant loops 20 and 22 and the first and/or second electrolyte solutions based on signals provided by the first and second reservoir temperature sensors 30 and 32. In particular, the controller 42 controls the coolant loops 20 and 22 and the flow regulators 56 and 58 to maintain temperatures of the first and/or second electrolyte solutions within the reservoirs 12 and 14 within a storage temperature range (e.g., between approximately 10° and 40° C.). The controller 42, for example, may signal the valves 64 and 66 and pumps 60 and 62 to circulate the electrolyte solutions between the first and second reservoirs 12 and 14 and the first and second flow circuit coolant loops 20 and 22 through the bypass conduits 52 and 54, rather than the return conduits 48 and 50. The controller 42 may then signal the circulation pumps 80 and 82 in the flow circuit coolant loops 20 and 22 to operate each respective coolant loop to cool the electrolyte solutions to a temperature between approximately 10° and 40° C.

In some embodiments, the controller 42 may control the coolant loops to cool one or both of the solutions to temperatures between approximately 10° and 40° C., and control the flow regulators to circulate the solutions through the flow battery stack to dissolve precipitate that has formed within one or more of the cells 92 and 94. In other embodiments, the first and/or second reservoirs 12 and 14 may each include an agitator that assists in dissolving precipitates that have formed in the respective electrolyte solution.

In some embodiments, the first and second flow circuit coolant loops 20 and 22 may be respectively disposed with the first and second reservoirs 12 and 14. In other embodiments, two or more of the coolant loops 20, 22 and 24 may be configured as a single coolant loop having a plurality of fluidly connected first heat exchangers 68, 70 and 72. In still other embodiments, the flow battery system 10 may include either the stack coolant loop 24 or the first and second flow circuit coolant loops 20 and 22. In still other embodiments, one or more of the coolant loops may be thermally connected to a heat source (e.g., the power converter or a local power producing device such as a fuel cell).

One of ordinary skill will recognize that the cooling and/or heating of the electrolyte solutions may be automatically regulated in various ways. In some embodiments, for example, the precipitate sensor 38 may include a pair of pressure sensors rather than the optical sensor. The pressure sensors may be operated together, for example, to detect precipitate within the first electrolyte solution based on pressure drop across the reference cell 94, or across the entire flow battery stack 26.

In some embodiments, the respective temperature, precipitate and/or state-of-charge sensors 34-40 may be disposed within the flow battery stack 26 where, for example, the reference cell 29 is configured within the flow battery stack 26. In other embodiments, the state-of-charge sensors 34-40 may be disposed outside of the reference cell, for example, in the return conduits 48 and/or 50.

In some embodiments, the first and/or second reservoirs 12 and 14 may each include a source reservoir and a return reservoir, such that the flow battery system 10 may operate in an open loop. Such an open loop system may enable the solutions in the source and return reservoirs to be maintained in different temperature ranges. In one embodiment, the source and return reservoirs may be configured as two separate tanks. In another embodiment, the source and return reservoirs may be disposed within the same tank, and may be separated by a divider (e.g., walls of a plastic bladder). In other embodiments, the first reservoir 12 and 14 may include a plurality of acidic ion-exchange beads for impeding precipitation of, for example, $V^{5+}$ therewithin.

While various embodiments of the flow battery system have been disclosed, it will be apparent to those of ordinary skill in the art that many more embodiments and implementations are possible within the scope of the flow battery system. Accordingly, the flow battery system is not to be restricted except in light of the attached claims and their equivalents.

What is claimed is:

1. A flow battery system, comprising:
   an electrolyte solution consisting of an aqueous solution of vanadium salts, which aqueous solution of vanadium salts includes a $V^{5+}$ ion species, and an aqueous acid, wherein the $V^{5+}$ ion species has a precipitate temperature greater than forty degrees Celsius;
   a flow battery stack configured to allow flow of the electrolyte solution therethrough;
   a controller;
   a temperature sensor in communication with the electrolyte solution, which temperature sensor produces a signal indicative of a temperature of the electrolyte solution;
   a coolant loop in selective heat exchange communication with the electrolyte solution; and
   a state-of-charge sensor in communication with the electrolyte solution, wherein the state-of-charge sensor senses a state-of-charge of ions in the electrolyte solution and produces a signal indicative of the state-of-charge of the ions in the electrolyte solution;
   wherein the controller is programmed to control the selective heat exchange communication between the coolant loop and the electrolyte communication based on one or both of the signal from the temperature sensor or the signal from the state-of-charge sensor to selectively maintain the temperature of the electrolyte solution above the greater than forty degrees Celsius precipitate temperature of the $V^{5+}$ ion species.

2. The system of claim 1, wherein the heat exchange communication is external to the flow battery stack.

3. The system of claim 1, wherein the coolant loop is in heat exchange communication with the electrolyte solution through a heat exchanger.

4. The system of claim 1, wherein the controller is further programmed to maintain the temperature of the electrolyte solution within the flow battery stack below approximately eighty degrees Celsius.

5. The system of claim 1, wherein the flow battery stack includes a flow battery cell coated with an acidic material that at least partially impedes formation of precipitate within the electrolyte solution within the flow battery cell.

6. The system of claim 1, further comprising a reservoir for storing the electrolyte solution, wherein the reservoir includes a plurality of acidic ion-exchange beads that at least partially impede formation of precipitate within the electrolyte solution within the reservoir.

7. The system of claim 1, further comprising a precipitate sensor in communication with the electrolyte solution, wherein the precipitate sensor senses an amount of precipitate in the electrolyte solution and provides a signal indicative of the amount of precipitate in the electrolyte solution, and wherein the controller is further programmed to control the selective heat exchange communication between the coolant loop and the electrolyte communication based on the signal indicative of the amount of precipitate in the electrolyte solution.

8. The system of claim 1, further comprising a reservoir for storing the electrolyte solution, wherein the reservoir comprises
   a source reservoir that provides the electrolyte solution to the flow battery stack; and
   a return reservoir that receives the electrolyte solution from the flow battery stack.

* * * * *